Patented Feb. 18, 1936

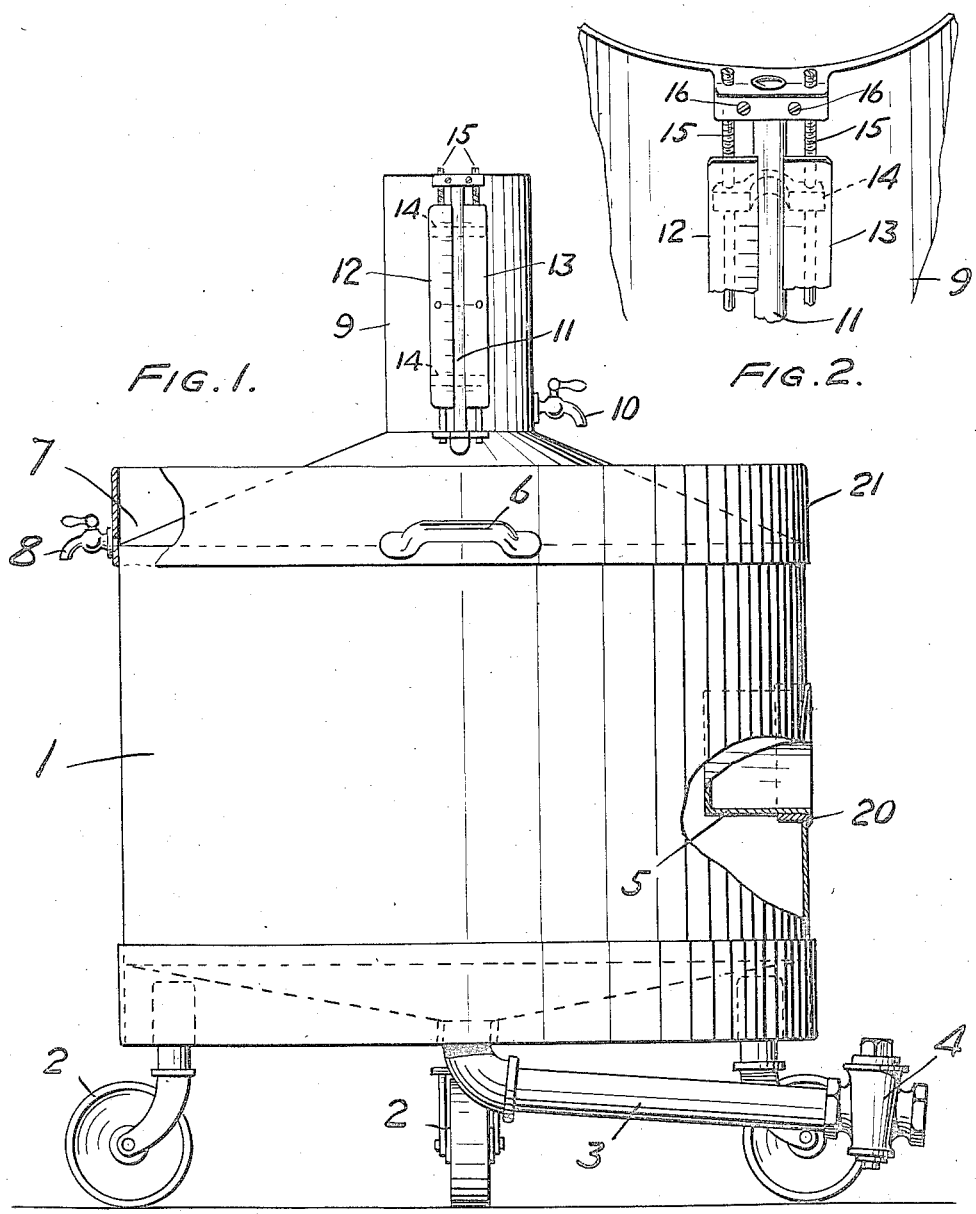

2,031,230

UNITED STATES PATENT OFFICE 2,031,230

FIELD STANDARD FOR TESTING LIQUID MEASURING DEVICES

Theophilus A. Seraphin, Philadelphia, Pa.

Application March 8, 1934, Serial No. 714,563

1 Claim. (Cl. 73—166)

This invention relates to a field standard for testing liquid measuring devices, and more especially to a standard of relatively large capacity.

The device in accordance with this invention comprises essentially an accurately graduated tank capable of being used in the field, that is, on the highways, etc. and which may be easily and conveniently filled from or through the measuring device to be tested, or alternatively emptied into or through a measuring device to be tested.

The various specific details of the device in accordance with this invention may best be understood by a description of the accompanying drawing, which shows a preferred embodiment of the device in accordance with this invention and in which—

Fig. 1 is a front elevation, partly in section, of the device, and

Fig. 2 is a detail view showing the mounting of the adjustable scales about the gauge.

In the drawing, 1 represents the body of the device in accordance with this invention, comprising essentially a cylinder with conical bottom and top portions, the whole tank being mounted upon casters 2 so that it may be easily moved. An outlet pipe 3 in which is placed a control valve 4 extends from the bottom of the container. A closed section of pipe 5 is inserted through a collar in the side of the cylinder, and the capacity of the device is adjusted by inserting this closed pipe 5 into the body of the tank to the desired extent and then welding or otherwise fastening it to the collar at 20.

The tank is provided with a pair of handles, one of which is shown at 6, to facilitate moving it about, and is also provided with a rim 21 extending above the point at which the conical top of the device begins and so forming a trough 7 in which any liquid that may be spilled while filling the device will collect and can be drawn off through the faucet 8. The conical top portion of the device ends in a cylindrical neck of relatively small cross section in comparison with the body of the device, so that relatively small differences in the amount of fluid contained in the device will cause a relatively large difference in the height of the fluid in the neck 9. A faucet 10 is set into this neck so that the level of the fluid therein may be lowered without the necessity of opening valve 4 for the withdrawal of fluid from the device.

Attached to the neck portion 9 is a gauge glass 11, which is open at its upper end and communicates with the interior of the device at its lower end. While this is called a gauge glass, it will preferably be formed of a transparent, unbreakable material such as, for example, a nitrocellulose or cellulose acetate plastic. Carried on the standards which support the gauge glass 11 are a pair of scales 12 and 13, respectively, which are adjustable by rotation of the threaded rods 15 which pass through the guide yokes 14, the lower of which is threaded to receive the rods, on which the scales are mounted. The rods 15, and hence the scales 12 and 13, may be clamped in position after adjustment by means of lock pins 16 which pass through cut out portions of the rods 15. The lock pins may be sealed against removal by a lead seal and wire passed through a hole therein (not shown).

In use, the device in accordance with this invention will first be standardized by a comparison with some standard measure of known capacity. The standardization will be effected, first, by movement of the closed pipe 5 into the proper position and by fastening it in such position, and, secondly, the final and fine adjustment will be made by moving the scales 12 and 13 in the manner hereinabove described until the zero mark on the scale 12 is placed exactly at the level of the liquid in the gauge glass 11.

After standardization in this manner by comparison with a primary standard, the device will be used as a secondary standard for testing various liquid measuring devices, such as gasoline pumps, meters, tanks, containers, etc. The test may be carried out by two different methods, depending upon the type of measuring device which is to be standardized or tested. One method is when the test measure receives the liquid from the device being tested and the contents are then observed by reading the gauge on the test measure; and the second method is when the test measure delivers an exact and known quantity of liquid to the device being tested.

In the first method, a certain quantity, let us say 50 gallons of fluid (as measured by the device to be tested) will be run into the standard device in accordance with this invention through the open neck 9. Any liquid which may be spilled as a result of negligent handling will collect in the trough 7, may be withdrawn through the faucet 8 and added to the rest of the liquid in the container, thus avoiding the necessity for repeating the test. The height of the liquid in the gauge glass will now be determined in reference to the scales 12 and 13. The zero point on the scale 12 will be set, as has been said, at, for example, exactly the 50 gallon mark. If desired, marks may be made on scale 13 above and below the zero point on the scale 12, indicating the limits of tolerance allowed in the measuring device which is to be tested. If the level of the liquid in the gauge glass 11 then falls within these limits of tolerance, the measuring device may be approved. If not, the device will be disapproved or certified as to exact amount of excess or deficiency as shown by the graduations on the scale 12, which indicate known quantities above and below the zero mark. When the test has been completed, the liquid will be emptied back into the measuring device or tank connected with such device through the outlet pipe 3 and the valve 4. Complete drainage is assured by the pitch of the bottom and slope of the outlet pipe.

A second method of testing devices involves filling the standard device in accordance with this invention with a known quantity, say 50 gallons, of liquid. This quantity of liquid will be run into the tank as before through the open neck 9. If, by inadvertence, more than 50 gallons of liquid are introduced into the tank, the excess portion can quickly be drawn off through faucet 10 and the level of the liquid in the neck be adjusted exactly at the zero mark on the scale 12. This known quantity of liquid will then be run into or through the measuring device to be tested through outlet pipe 3 and valve 4 and any shortage, excess, or overflow of liquid in the device to be tested observed.

It will be seen that the field standard in accordance with this invention comprises an easily movable tank, the capacity of which can be exactly adjusted by means of both gross and fine adjustments to a predetermined figure. The tank may be easily filled and emptied and will be found to be especially suitable for use by a single operator who need have little or no experience in the operation of such field standards.

What I claim and desire to protect by Letters Patent is:

A field standard of the character described comprising a container having a neck of relatively small cross-sectional area with respect to the body of the container, a trough about said container below the neck adapted to retain any overflow therefrom, an outlet from said trough to drain liquid therefrom, means attached to said neck for indicating the level of liquid in said container, a relatively large outlet for draining liquid from the container, a relatively small outlet positioned in said neck and adapted to drain liquid into said trough and a control valve therefor, whereby a portion of the liquid may be withdrawn from the container to adjust the liquid level therein.

THEOPHILUS A. SERAPHIN.